A. D. ELLINGTON.
PULSATOR FOR MILKING MACHINES.
APPLICATION FILED APR. 29, 1920.
1,381,111.
Patented June 14, 1921.
2 SHEETS—SHEET 1.
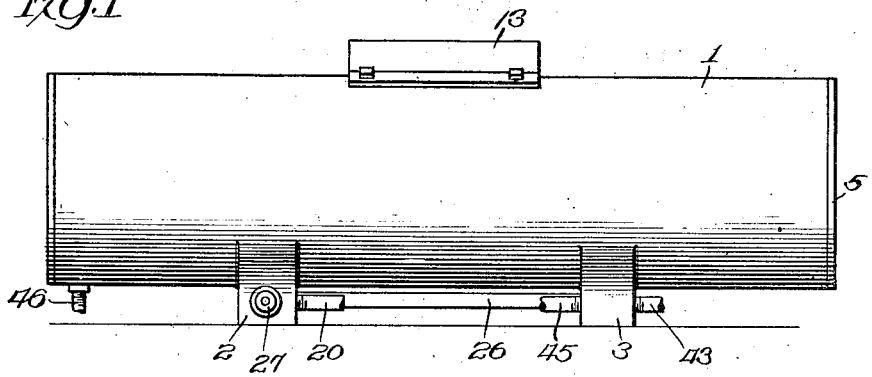
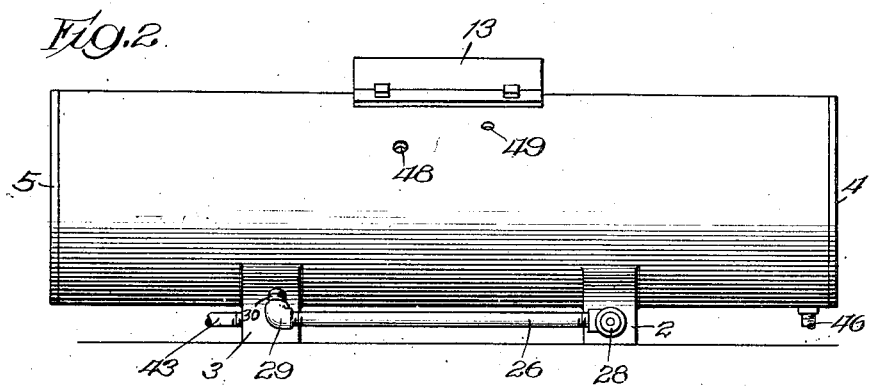
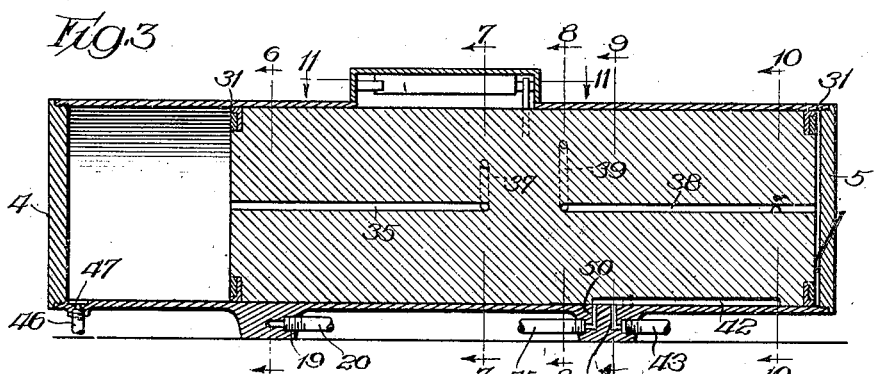
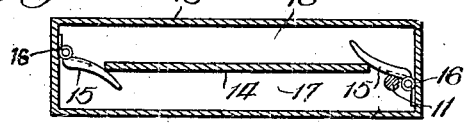

A. D. ELLINGTON.
PULSATOR FOR MILKING MACHINES.
APPLICATION FILED APR. 29, 1920.
1,381,111.
Patented June 14, 1921.
2 SHEETS—SHEET 2.
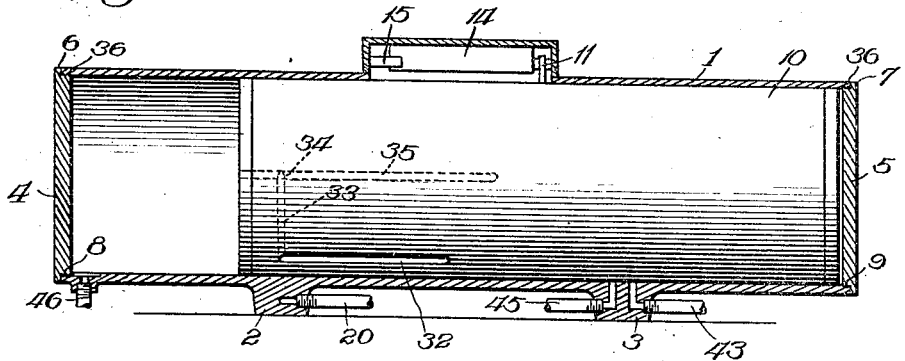
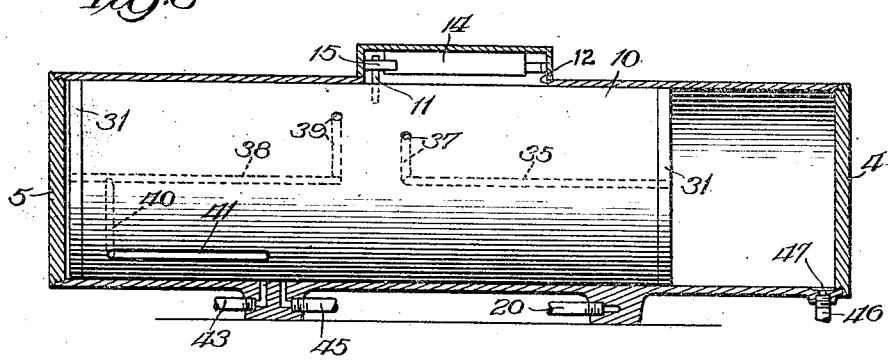
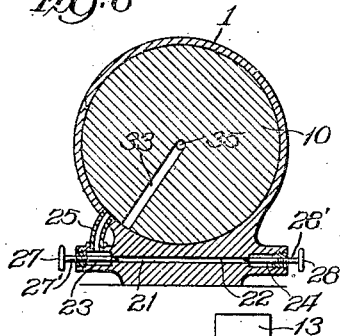
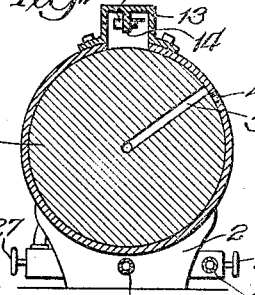
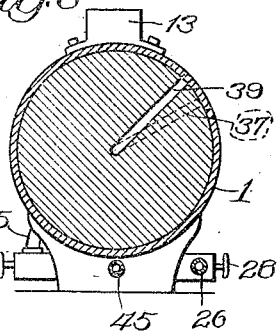
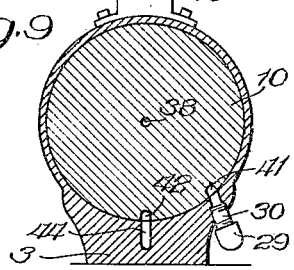
Inventor
A. D. Ellington
By Munn & Co.
Atty's.

UNITED STATES PATENT OFFICE.

AARON D. ELLINGTON, OF SPRINGFIELD, ILLINOIS.

PULSATOR FOR MILKING-MACHINES.

1,381,111.  Specification of Letters Patent.  Patented June 14, 1921.

Application filed April 29, 1920. Serial No. 377,661.

*To all whom it may concern:*

Be it known that I, AARON D. ELLINGTON, a citizen of the United States, and a resident of Springfield, in the county of Sangamon and State of Illinois, have invented a new and useful Improvement in Pulsators for Milking-Machines, of which the following is a full, clear, and exact description.

My invention relates to improvements in pulsators for milking machines, and it consists in the combinations, constructions and arrangements herein described and claimed.

An object of my invention is to provide a pulsator for milking machines in which means is provided for alternately transmitting to teat cups or other parts of the machine pressure and vacuum impulses whereby squeezing and sucking actions are alternately produced.

A further object of my invention is to provide a device of the type described in which means is provided for regulating independently of each other the pressure and vacuum impulses.

A further object of my invention is to provide a device of the type described which will function uniformly and efficiently and which is not likely to get out of order easily.

A further object of my invention is to provide a device of the type described that is thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a side elevation of the device,

Fig. 2 is a view in elevation of the opposite side of the device to that shown in Fig. 1, Fig. 3 is a central longitudinal section through the device, Fig. 4 is a central longitudinal section through the device as shown in Fig. 1, the piston valve therein being shown in elevation, Fig. 5 is a central longitudinal section through the device as shown in Fig. 2, the piston valve being shown in elevation, Fig. 6 is a section along the line 6—6 of Fig. 3, Fig. 7 is a section along the line 7—7 of Fig. 3, Fig. 8 is a section along the line 8—8 of Fig. 3, Fig. 9 is a section along the line 9—9 of Fig. 3, Fig. 10 is a section along the line 10—10 of Fig. 3, Fig. 11 is a section along the line 11—11 of Fig. 3.

In carrying out my invention, I provide a cylindrical casing 1, which is mounted upon supports 2 and 3. The latter may be formed integral with the casing 1 as pictured in the accompanying drawings, or may be formed separately and secured thereto. The cylindrical casing 1 has ends 4 and 5, which are formed with radially extending flanges 6 and 7 and with screw threaded portions 8 and 9 adapted to screw into the ends of the casing 1 which are threaded at 36, thereby securely closing the casing.

A cylindrical piston valve 10 is mounted for reciprocation within the cylindrical casing 1 and is guided in its reciprocation by a pin 11, which is rigidly secured to the piston valve 10 and has its upper end projecting through a rectangular slot 12 in the upper portion of the casing 1. The rectangular slot 12 is surrounded and covered by a housing 13 which has a central member 14 depending from the top of the housing 13, thus providing the guide-ways 17 and 18. It will be noted that the central member 14 does not extend to the end walls of the housing 13. The pin 11 may therefore pass around the ends of the member 14. A trigger 15 is disposed between each end of the central member 14 and the adjacent end wall of the housing 13. The trigger 15 is formed integrally with a spring 16 which is rigidly secured to each end wall of the housing 13, thereby tending to hold the trigger 15 against the end of the central member 14. It will be obvious that the trigger 15 may be moved toward the adjacent side wall of the housing 13 against the tension of the spring 16. When the piston 10 is being reciprocated, the guiding pin 11 will be moved into contact with the trigger 15, forcing the latter toward the adjacent side wall of the housing 13. When the guiding pin 11 has reached a point beyond the end of the central member 14, the spring 16 will tend to move the trigger 15 into the position indicated by the full lines in Fig. 11 of the accompanying drawings, thereby throwing the guiding pin 11 into the other guide-way.

The support 2 is formed with an opening 19 adapted to receive a pipe 20. The latter communicates with an air pump (not shown) and divides within the support 2 to form the branch pipes 21 and 22, (see Fig. 6). A needle valve 23 is disposed within the branch pipe 21 while a similar needle valve 24 is disposed within the branch pipe 22. The volume of compressed air passing through the branch pipes 21 and 22 may therefore be regulated independently of each other by operation of the needle valves 23 and 24, which is accomplished by means of the handles 27 and 28, which are connected to the valves 23 and 24 by means of the stems 27' and 28'.

A pipe 25 communicates with the branch pipe 21 adjacent its end and extends to the interior of a cylindrical casing 1, as best seen in Fig. 6 of the accompanying drawings. A pipe 26 communicates with the end of the branch pipe 22 and extends parallel to the casing 1 to connect at 29 with an inlet air pipe 30, as best seen in Fig. 2 of the accompanying drawings. The latter extends at right angles to the pipe 26 to communicate with the interior of the casing 1, as clearly shown in Fig. 9.

The piston valve 10 is provided with gaskets 31, or the like, at its ends. By referring to Figs. 3, 4, and 5, it will be noted that the piston valve 10 is formed with a central longitudinal passage 35 in one end and a second central longitudinal passage 38 extending inwardly from the other end thereof. The central passage 35 communicates at its inner end with a radially extending channel 37, which extends to the surface of the piston valve 10. A second radially extending channel 33 communicates with the central passage 35 at 34, which, it will be observed, is adjacent its outer end, and extends to the surface of the piston valve 10 to communicate with a longitudinally extending groove 32. Likewise, a radially extending passage 39 communicates with the inner end of the central passage 38 and extends at right angles thereto to the surface of the piston valve 10. A second radially extending passage 40 connects the central passage 38 adjacent its outer end to a longitudinal groove 41, which is formed in the surface of the piston valve 10. The longitudinal grooves 32 and 41 are equal in length and are approximately the same in length as the distance between the adjacent end of the piston valve 10 and the wall 4 when the piston valve 10 is in the position pictured in Fig. 5 of the accompanying drawings.

An additional longitudinal groove 42 is provided in the surface of the piston valve 10, as shown in Fig. 3 of the accompanying drawings. A pipe 43 leads from a vacuum pump (not shown) to connect with the pipe 44, which extends through the support 3 and communicates with the interior of the casing 1. An outlet pipe 50 also communicates with the interior of the casing 1 and connects with a pipe 45, which leads to the teat cups (not shown). The groove 42 is in registration with the open ends of the pipes 44 and 50 when the piston 10 is in the position pictured in Fig. 3 of the accompanying drawings. It is to be also noted that the groove 42 and the grooves 32 and 41 are equal in length.

An outlet pipe 46 communicates with the cylindrical casing 1 near the end 4 and extends to the teat cups (not shown). The side wall of the casing 1 is formed with a slot 47 in its inner surface to extend from the end wall 4 to the outlet pipe 46 thus insuring the flow of air through the latter when the piston valve is very close to the end 4.

From the foregoing description of the various parts of the device, the operation thereof may be readily understood. Compressed air passes from a suitable source through the pipe 20 into the branch pipes 21 and 22. The valves 23 and 24 may then be operated independently of each other to regulate the volume of compressed air passing through the branch pipes 21 and 22 into the interior of the casing 1. During the entire time the guiding pin 11 is disposed within the guide-way 17, the longitudinal groove 41 will be in registration with the open end of the inlet air pipe 30. At the same time, the longitudinal groove 42 will be in registration with the ends of the pipes 44 and 50.

Just before the guiding pin 11 has been thrown into the position pictured in Figs. 3 and 11 of the accompanying drawings, the open end of the pipe 37 is moved into registration with the opening 49, thereby permitting the escape of the air which has been compressed between the piston valve 10 and the end 4. When the piston valve 10 is in the position shown in Fig. 3, compressed air flows through the pipe 20, the branch pipe 22, the air inlet pipe 30, along the longitudinal groove 41, through the radially extending passage 40, and the longitudinal central passage 38 against the wall of the end 5, thereby driving the piston valve 10 in the direction of the end 4. This is the suction stroke of the piston and a sucking action will be produced until the piston valve reaches a point adjacent the end 4. The guiding pin 11 will at that time pass beyond the end of the central member 14 and will be thrown across into the guide-way 18, thus rotatably moving the piston 10 and throwing the longitudinal groove 41 out of communication with the end of the inlet pipe 30 and also moving the longitudinal groove 42 out of communication with the ends of the pipes 44 and 50. During the cross-over of the guiding pin 11 from the guide-way 17 to the guide-way 18, the end of the pipe 39 will be moved into registration with an opening 48, which is formed in the wall of the casing 1, thereby permitting the escape of the compressed air from the space between the end of the piston valve 10 and the wall 5.

Concurrently with the movement of the guiding pin 11 into the guide-way 18, the longitudinal groove 32 will be moved into communication with the open end of the air pipe 25 and compressed air will flow through the pipe 20, the branch pipe 21, the air inlet pipe 25, along the longitudinal groove 32, through the radially extending passage 33, and the longitudinal central passage 34, thereby driving the piston valve 10 in the direction of the end 5. The longitudinal groove 32 will remain in communication with the open end of the air pipe 25 until the adjacent end of the piston valve 10 reaches the point near the end 4. During this time compressed air will flow through the outlet pipe 46 to the teat cups (not shown), thereby producing a squeezing action.

One of the principal advantages of the device lies in the fact that the length of time required for driving the piston valve toward the end 5 can be regulated by operation of the valve 23 and that the length of time required for driving the piston valve 10 in the direction of the end 4 can be regulated by operation of the valve 24. Consequently both the sucking action and the squeezing action can be regulated independently of each other, thereby insuring the effective functioning under varying conditions of service of a milking machine to which the device is applied.

It is obvious that modifications and adaptations of the form of the device illustrated in the accompanying drawings may be provided without departing from the spirit and scope of the invention, as disclosed in the foregoing and outlined more particularly in the appended claims. I therefore consider such adaptations and modification as my own.

I claim:

1. A pulsator for a milking machine comprising a cylindrical casing, a piston valve mounted for reciprocation therein, means for conducting compressed air alternately to opposite ends of the piston valve, thereby causing the reciprocation of the latter, means for permitting the exhaust of compressed air from the cylindrical casing at the end of each stroke of the piston valve, means for conducting compressed air to a coöperating portion of a milking machine when the piston valve is being moved in one direction, thereby transmitting a compressive action to the coöperating portion of the milking machine, means for establishing communication between a vacuum pump and a coöperating portion of the milking machine when the piston valve is being moved in the direction opposite to that first named, thereby transmitting a sucking action to the last named coöperating portion of the milking machine, and means for regulating the rate of travel of the piston valve in its reciprocation, thereby regulating the duration of the compressive action and of the sucking action.

2. A pulsator for a milking machine comprising a cylindrical casing, a piston valve mounted for reciprocation therein, means for conducting compressed air alternately to opposite ends of the piston valve, thereby causing the reciprocation of the latter, means for permitting the exhaust of compressed air from the cylindrical casing at the end of each stroke of the piston valve, means for conducting compressed air to a coöperating portion of a milking machine when the piston valve is being moved in one direction, thereby transmitting a compressive action to the coöperating portion of the milking machine, means for establishing communication between a vacuum pump and a coöperating portion of the milking machine when the piston valve is being moved in the direction opposite to that first named, thereby transmitting a sucking action to the last named coöperating portion of the milking machine, and means for regulating the rate of travel of the piston valve in its movement in one direction and for regulating independently the rate of travel of the piston valve in its movement in the opposite direction, whereby the duration of the compressive action and the duration of the sucking action can be regulated at will.

3. A pulsator for a milking machine comprising a cylindrical casing, a piston valve mounted for reciprocation therein, a pipe adapted for connection with an air compressor, a pair of branch pipes arranged to lead from said first named pipe into the cylindrical casing, means for permitting compressed air to pass alternately from each of said branch pipes into the casing adjacent each end thereof, thereby causing the piston valve to be reciprocated, means for permitting the exhaust of compressed air from the cylindrical casing at the end of each stroke of the piston valve, means for conducting compressed air to a coöperating portion of a milking machine when the piston valve is being moved in one direction, thereby transmitting a compressive action to the coöperating portion of the milking machine, means for establishing communication between a vacuum pump and a coöperating portion of the milking machine when the piston valve is being moved in the direction opposite to that first named, thereby transmitting a sucking action to the last named coöperating portion of the milking machine, and means for regulating the rate of travel of the piston valve in its movement in one direction and for regulating independently the rate of travel of the piston valve in its movement in the opposite direction, whereby the duration of the compressive action and the duration of the sucking action can be regulated at will.

4. A pulsator for a milking machine comprising a cylindrical casing, a piston valve mounted for reciprocation therein, a pipe adapted for connection with an air compressor, a pair of branch pipes arranged to lead from said first named pipe into the cylindrical casing, means for permitting compressed air to pass alternately from each of said branch pipes into the casing adjacent each end thereof, thereby causing the piston valve to be reciprocated, means for permitting the exhaust of compressed air from the cylindrical casing at the end of each stroke of the piston valve, means for conducting compressed air to a coöperating portion of a milking machine when the piston valve is being moved in one direction, thereby transmitting a compressive action to the coöperating portion of the milking machine, means for establishing communication between a vacuum pump and a coöperating portion of the milking machine when the piston valve is being moved in the direction opposite to that first named, thereby transmitting a sucking action to the last named coöperating portion of the milking machine, and a valve disposed in each of said branch pipes to control the flow of compressed air therethrough, thereby permitting the duration of the compressive action and the duration of the sucking action to be regulated independently of each other.

5. A pulsator for a milking machine comprising a cylindrical casing, a pipe adapted for connection with an air compressor, a branch pipe arranged to lead from said first named pipe to said casing and to communicate with the latter adjacent one end, a second branch pipe arranged to lead from said first named pipe to said casing and to communicate with the latter adjacent its other end, a piston valve mounted for reciprocation in said casing, said piston valve being formed with a central longitudinal passage extending inwardly from each end thereof, the inner ends of said pistons being spaced apart, each central passage being connected adjacent its outer end by a radially extending passage with the outer end of a longitudinally extending groove provided in the surface of the piston valve, said longitudinal grooves being positioned at different points on the surfaces of the piston valve, means for guiding the piston valve whereby one of said grooves is maintained in connection with the open end of one of said branch air pipes, thus causing a movement of the piston valve in one direction, means for rotatably shifting the piston valve at the end of its movement in one direction, thereby moving the other of said longitudinal grooves in communication with the opening of the other of said branch pipes, thereby causing a movement of the piston valve in the direction opposite to that first named, means for permitting the exhaust of compressed air of the cylindrical casing at the end of each stroke of the piston valve, means for conducting compressed air to a coöperating portion of the milking machine when the piston valve is being moved in one direction, thereby transmitting a compressive action to the coöperating portion of the milking machine, means for establishing communication between the vacuum pump and the coöperating portion of the milking machine when the piston valve is being moved in the direction opposite to that first named, thereby transmitting a sucking action to the last named coöperating portion of the milking machine, and a valve disposed in each of said branch pipes for regulating the flow of compressed air therethrough, thereby permitting the regulation of the duration of the compressive action of the sucking action independently of each other.

6. A pulsator for a milking machine, composing a cylindrical casing, a support therefor, a piston valve mounted for reciprocation therein, means for conducting compressed air alternately to opposite ends of the piston valve, thereby causing a reciprocation of the latter, means for permitting the exhaust of compressed air from the cylindrical casing at the end of each stroke of the piston valve, an outlet pipe arranged to communicate with said casing adjacent one end thereof, said outlet pipe being adapted for connection with a coöperating portion of the milking machine, whereby a compressive action is transmitted to the latter when the piston valve is being moved in one direction, means for establishing communication between a vacuum pump and a coöperating portion of the milking machine when the piston valve is being moved in the direction opposite to that first named, thereby transmitting a sucking action to the last named coöperating portion of the milking machine, and means for regulating the rate of travel of the piston valve in its movement in one direction and for regulating independently the rate of travel of the piston valve in its movement in the opposite direction, whereby the duration of the compressive action and the duration of the sucking action can be regulated at will.

7. A pulsator for a milking machine comprising a cylindrical casing, a piston valve mounted for reciprocation therein, said piston valve being provided with a longitudinal groove in its surface, the outer end of said groove being spaced from the end of the piston, means for conducting compressed air alternately to opposite ends of the piston valve, thereby causing a reciprocation of the latter, means for permitting the exhaust of compressed air from the cylindrical casing at the end of each stroke of the piston valve, means for conducting compressed air to a coöperating portion of the milking machine when the piston valve is being moved in one direction, thereby transmitting the compressive action to the coöperating portion of the milking machine, an inlet pipe arranged to communicate with the longitudinal groove in said piston when the latter is being moved in the direction opposite to that first named, a second pipe arranged to also communicate with said groove when the piston is being moved in the last named direction, said last named pipe being adapted for connection with a coöperating portion of the milking machine, whereby a sucking action is transmitted to the last named coöperating portion of the milking machine when the piston valve is being moved in the last mentioned direction, means for regulating the rate of travel of the piston valve in its movement in one direction, and other means for regulating the rate of travel of the piston valve in its movement in the opposite direction, whereby the duration of the compressive action and the duration of the sucking action can be regulated at will independently of each other.

AARON D. ELLINGTON.